US011984636B2

(12) United States Patent
Afonso

(10) Patent No.: US 11,984,636 B2
(45) Date of Patent: May 14, 2024

(54) ACTIVE WAVEGUIDE TRANSITION HAVING A PROBE AND RF AMPLIFIER SYSTEM AND WHICH IS USABLE IN A TRANSMIT/RECEIVE COMMUNICATION SYSTEM

(71) Applicant: AIRBUS ONEWEB SATELLITES SAS, Toulouse (FR)

(72) Inventor: Arthur Savio Afonso, Colomiers (FR)

(73) Assignee: AIRBUS ONEWEB SATELLITES SAS, Toulouse (FR)

( * ) Notice: Subject to any disclaimer, the term of this patent is extended or adjusted under 35 U.S.C. 154(b) by 277 days.

(21) Appl. No.: 17/296,028

(22) PCT Filed: Nov. 18, 2019

(86) PCT No.: PCT/EP2019/081610
§ 371 (c)(1),
(2) Date: May 21, 2021

(87) PCT Pub. No.: WO2020/104358
PCT Pub. Date: May 28, 2020

(65) Prior Publication Data

US 2022/0021097 A1 Jan. 20, 2022

(30) Foreign Application Priority Data

Nov. 22, 2018 (EP) .................................... 18306547

(51) Int. Cl.
*H01P 1/213* (2006.01)
*H01P 5/103* (2006.01)
(Continued)

(52) U.S. Cl.
CPC ............ *H01P 1/213* (2013.01); *H01P 1/2135* (2013.01); *H01P 1/2138* (2013.01); *H01P 5/103* (2013.01); *H01P 5/183* (2013.01); *H01Q 1/288* (2013.01)

(58) Field of Classification Search
CPC ...... H01P 5/103; H01P 1/2135; H01P 1/2138; H01P 1/213; H01Q 1/288
(Continued)

(56) References Cited

U.S. PATENT DOCUMENTS 4,608,713 A * 8/1986 Shiomi et al. ......... H01Q 1/247 455/328
4,679,249 A * 7/1987 Tanaka et al. .......... H01P 5/107 455/328

(Continued)

FOREIGN PATENT DOCUMENTS

| | | | |
|---|---|---|---|
| EP | 1 772 928 | A1 | 4/2007 |
| JP | 2007 214655 | A | 8/2007 |
| WO | 03 041412 | A1 | 5/2003 |

*Primary Examiner* — Benny T Lee
(74) *Attorney, Agent, or Firm* — The Culbertson Group, P.C.; Russell D. Culbertson

(57) ABSTRACT

An active waveguide transition includes a waveguide defining a waveguide volume and including a back short wall at a first end. A first probe is mounted on the waveguide in an operable position extending into the waveguide volume, and a first RF electrical signal connector is mounted on the active waveguide transition. A first circuit assembly is mechanically coupled to an exterior surface of the waveguide, the circuit assembly including a first multi-layer ceramic substrate with an RF amplifier system mounted thereon. The RF amplifier system is electrically coupled to the multi-layer ceramic substrate, the first probe, and the first RF electrical signal connector to define an active first signal path for RF communication signals between the probe and first RF signal connector.

16 Claims, 9 Drawing Sheets

(51) Int. Cl.
*H01P 5/18* (2006.01)
*H01Q 1/28* (2006.01)

(58) Field of Classification Search
USPC .............................................. 333/23, 134, 26
See application file for complete search history.

(56) References Cited

U.S. PATENT DOCUMENTS

| | | | | |
|---|---|---|---|---|
| 5,554,960 | A * | 9/1996 | Ohnuki et al. | H03H 9/725 333/132 |
| 5,678,210 | A * | 10/1997 | Hannah | H04B 1/0458 455/81 |
| 6,275,479 | B1 * | 8/2001 | Snell et al. | H01Q 25/007 455/13.3 |
| 6,967,543 | B2 * | 11/2005 | Ammar | H01P 5/107 333/248 |
| 2003/0197572 | A1 | 10/2003 | Ammar | |
| 2005/0219007 | A1 | 10/2005 | Tsai | |
| 2014/0285383 | A1 * | 9/2014 | Fakharzadeh et al. | H01P 5/08 343/702 |

* cited by examiner

ACTIVE WAVEGUIDE TRANSITION HAVING A PROBE AND RF AMPLIFIER SYSTEM AND WHICH IS USABLE IN A TRANSMIT/RECEIVE COMMUNICATION SYSTEM

TECHNICAL FIELD OF THE INVENTION

The invention relates to radio frequency (RF) communications systems and more particularly to waveguide transitions and RF communications systems using such waveguide transitions.

BACKGROUND OF THE INVENTION

In RF signal transmission and receiving systems, particularly at frequencies above 1 GHz, horn-type antennae may be used to both receive and transmit RF signals. Horn-type antennae are characterized by a horn structure (sometimes referred to as a feedhorn) which may, for example, be pyramidal or conical in shape which provides a guide for guiding RF waves along a wave path. The horn structure may connect to a waveguide of suitable profile for guiding the RF waves between the horn structure and a waveguide-to-cable transition (referred to herein as a "waveguide transition"). For purposes of receiving the incoming RF signals, the waveguide transition (also referred to as an "adapter") functions to convert the wave propagating from the horn structure to a corresponding electrical signal which is output via an RF connector and suitable transmission cable for processing by suitable signal processing equipment (e.g., a waveguide dominant mode to a coaxial mode). For purposes of transmitting RF signals, the waveguide transition converts electrical signals from signal transmission circuitry to RF waves which ultimately propagate through the horn structure and into free space (e.g., a coaxial mode to a waveguide dominant mode).

A suitable waveguide is necessary to provide an RF wave propagation path between the horn structure and waveguide transition of a given RF communication system. Because these waveguides include or are made up entirely of rigid sections, they typically must be manufactured specifically for a given route between a given horn structure and waveguide transition, and this can make manufacturing difficult. Additionally, routing the rigid sections of the waveguide between the horn structure and waveguide transition may be challenging particularly in situations in which space is limited such as in a communication system onboard a satellite or vehicle. Furthermore, the waveguide extending between the horn structure and waveguide transition may be relatively heavy and bulky, and thus undesirable in many applications, especially under tight space (volume) and weight budgets such as with communications satellites.

SUMMARY OF THE INVENTION

It is an object of the invention to overcome the above-described problems and others associated with RF communications systems, and particularly the issues arising from the use of waveguides in such RF communications systems to guide RF waves between a horn structure and waveguide transition.

A first aspect of the invention encompasses an active waveguide transition which includes a waveguide defining a waveguide volume, a first probe mounted in the waveguide, and a first RF electrical signal connector. The waveguide includes a back short wall at a first end, and the first probe is mounted on the waveguide in an operable position extending into the waveguide volume. An "operable position" in this sense for the first probe means that the first probe is located within or near the waveguide volume so that the probe may convert some of the energy of the RF waves propagating through the waveguide along a propagation axis thereof to corresponding RF electrical signals and/or convert some of the energy of an applied RF electrical signal to RF waves propagating along the waveguide. The active waveguide transition also includes a first circuit assembly mechanically coupled to an exterior surface of the waveguide. The circuit assembly includes a first multi-layer ceramic substrate with an RF amplifier system mounted thereon. The RF amplifier system is electrically coupled to the multi-layer ceramic substrate, the first probe, and the first RF electrical signal connector to define an active first signal path for RF communication signals between the first probe and first RF signal connector.

A second aspect of the present invention encompasses an RF communication system including an active waveguide transition according to the first aspect of the invention operably connected to a feedhorn of an RF antenna. Here, an end of the active waveguide transition opposite to the end enclosed by the back short wall provides the point for the operable connection to the feedhorn. The operable connection in this sense means a connection which allows RF waves to propagate from the feedhorn to the active waveguide transition and to propagate in the opposite direction from the active waveguide transition to the feedhorn.

A third aspect of the present invention encompasses a satellite having an RF communication system employing an active waveguide transition according to the first aspect of the invention. In this case the satellite will have an RF antenna system which includes a feedhorn operably connected to the active waveguide transition.

By incorporating the RF amplifier system with the waveguide according to any of the aspects of the invention, an RF communication system incorporating the active waveguide transition is able to dispense with a waveguide which would otherwise be required to provide an RF wave path from the feedhorn of an RF antenna to the waveguide transition. This elimination of the intermediate waveguide simplifies design and construction of an RF communication system, reduces the overall weight and volume of the system, and also reduces a system's cost.

In any of the aspects of the invention the exterior surface of the waveguide portion of the active waveguide transition may be planar and the first circuit assembly includes a circuit attachment surface that abuts the waveguide exterior surface. Also, the first multi-layer ceramic substrate may be mounted within a housing of the first circuit assembly and the circuit attachment surface in that case comprises a surface of the housing.

To provide an exterior surface of the waveguide portion of an active waveguide transition which is planar to facilitate attaching of the first circuit assembly, the waveguide portion of an active waveguide transition may have a substantially constant rectangular cross-section. However, active waveguide transitions according to the invention are not limited to this rectangular waveguide configuration. Rather, at least a portion of the waveguide included in an active waveguide transition according to the first aspect of the invention may have an elliptical, circular, or any other suitable cross-sectional shape.

The RF amplifier system of an active waveguide transition according to any of the aspects of the invention may include one or more RF amplifiers mechanically coupled to a peripheral layer of the first multi-layer ceramic substrate. These one or more RF amplifiers may be low-noise amplifiers. Furthermore, the first multi-layer ceramic substrate may include a first embedded RF filter electrically coupled to the first probe and the RF amplifier within the first signal path. The first embedded RF filter may include at least one of a low-pass filter, a high-pass filter, and a band-pass filter. Also, in any of the aspects of the invention, the multi-layer ceramic substrate may be a low-temperature co-fired ceramic (LTCC) package.

In order to facilitate the desired operable connection between the active waveguide transition and RF communication feedhorn, the active waveguide transition may include a waveguide connector at the end of the waveguide opposite to the back short wall. The waveguide connector in this case is adapted to operably connect the waveguide transition to a corresponding connector of the RF communication feedhorn. For example, the waveguide connector may comprise a transition flange adapted to operably connect with a corresponding flange of the feedhorn. Where a transition flange is provided, it may be integrally formed with the waveguide portion of the active waveguide transition. Similarly, the feedhorn may be integrally formed with the feedhorn flange. Alternatively to providing a connector for an active waveguide transition according to the first aspect of the invention, in some embodiments the feedhorn may be integrally formed with the waveguide portion of the active waveguide transition.

An active waveguide transition according to any of the aspects of the invention may further include a second RF electrical signal connector which is electrically coupled to the first probe to define a signal path between the first probe and the second RF electrical signal connector. In this case the signal path between the first probe and the first RF electrical signal connector is for a receive RF communication signal and the signal path between the first probe and the second RF electrical signal connector may be a passive signal path for a transmit RF communication signal. In other forms of the invention an amplifier system may be included in the signal path between the first probe and the second connector to amplify the transmit RF communication signal.

Where signal paths are provided for received signals and signals to be transmitted, the receive RF communication signal may be within a first frequency range while the transmit RF communication signal is within a second frequency range which does not overlap with the first frequency range. In these embodiments, a first embedded RF filter may be electrically coupled to the first probe and the RF amplifier within the received signal path, while a second embedded RF filter may be electrically coupled in the transmit signal path. The first embedded RF filter is adapted to pass the received RF communication within the first frequency range and suppress signals within the second frequency range. The second embedded RF filter is adapted to pass the transmit RF communication signal within the second frequency range and suppress signals within the first frequency range. The first and second embedded RF filters may be included in a diplexer. In any case, one or both of the RF electrical signal connectors may comprise a coaxial connector adapted to connect to a corresponding connector of a coaxial cable. Also, either or both of the RF electrical signal connectors may be further adapted to accept a power signal for powering an RF amplifier included in the active waveguide transition.

An RF communication system according to the second or third aspects of the invention noted above may be adapted to receive, transmit, or both receive and transmit RF communication signals of one or more frequencies selected from 300 MHz to 300 GHz.

An active waveguide transition according to the first aspect of the invention set forth above may additionally include a second probe mounted on the waveguide in an operable position extending into the waveguide volume. In these embodiments a second RF electrical signal connector is electrically coupled to the second probe to define a signal path there between, and a second multi-layer ceramic substrate may be electrically coupled between the second RF electrical signal connector and the second probe. The second multi-layer ceramic substrate may be included in a second circuit assembly mechanically coupled to the exterior surface of the waveguide. Where first and second circuit assemblies are included, one such assembly may be mechanically coupled to a first portion of the waveguide exterior surface and the second such assembly may be mechanically coupled to a second portion of the waveguide exterior surface, the first and second portions defining parallel or orthogonal planes.

In an active waveguide transition including two separate probes, one probe may be arranged as an open-circuit probe of a right-angle transition, with the other probe arranged as a short-circuited probe of an in-line transition.

These and other advantages and features of the invention will be apparent from the following description of representative embodiments, considered along with the accompanying drawings.

DESCRIPTION OF REPRESENTATIVE EMBODIMENTS

Figure 1:
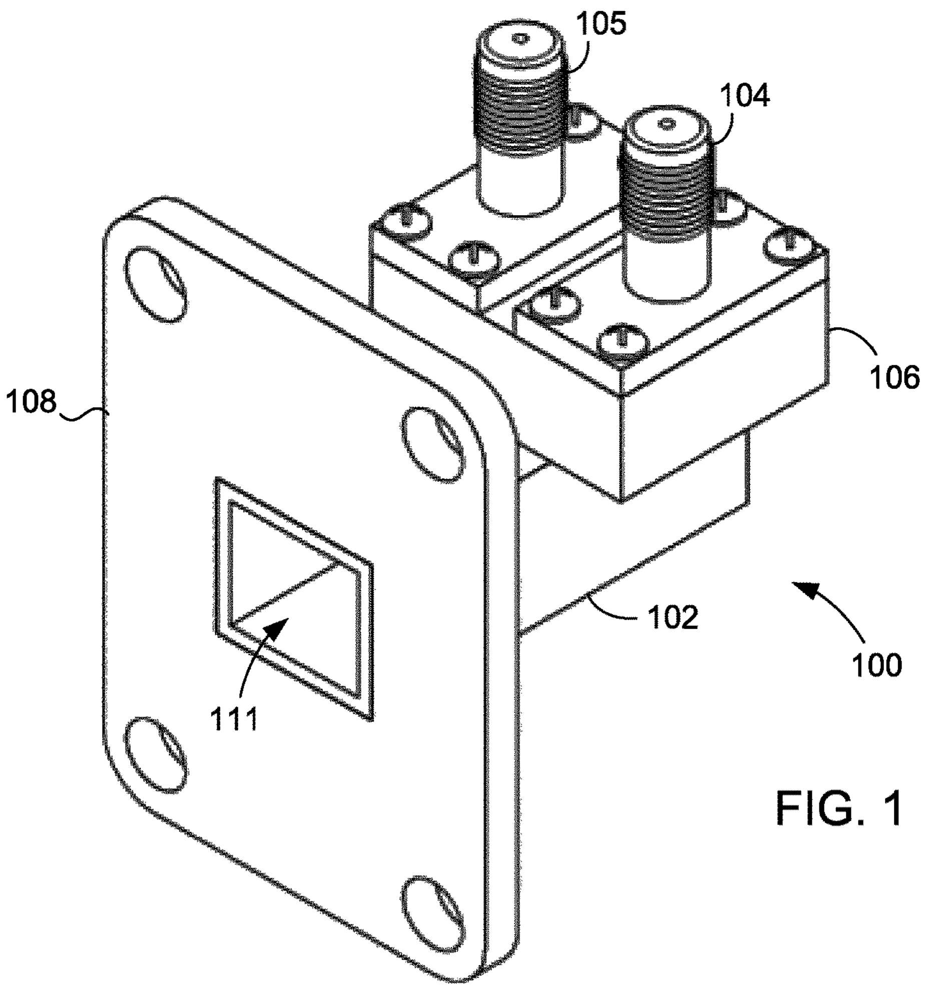
FIG. 1 is a view in perspective of an active waveguide transition according to one aspect of the present invention.
Figure 2:
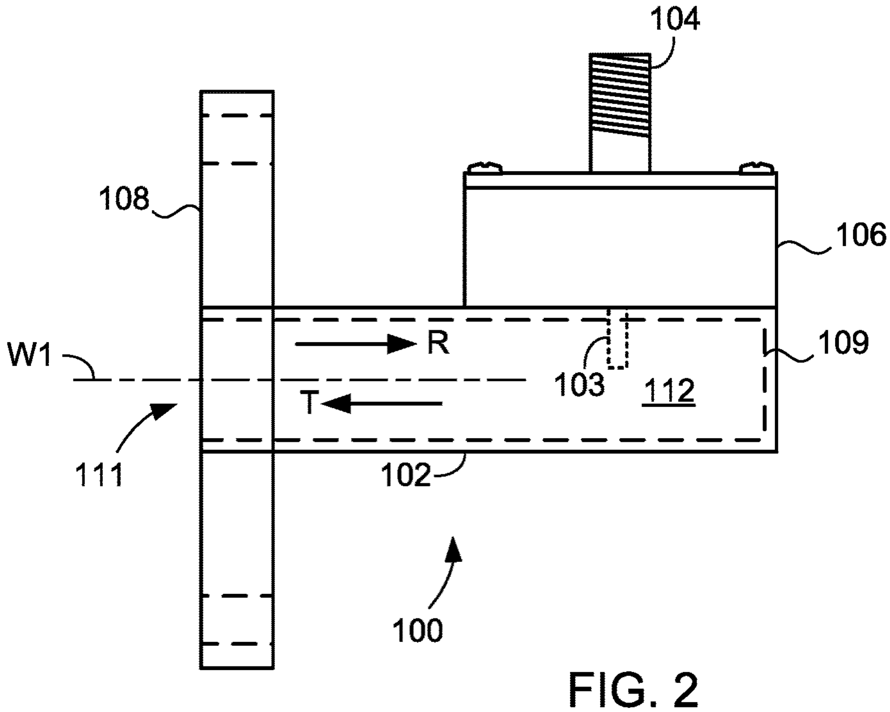
FIG. 2 is a side view of the active waveguide transition shown in FIG. 1.
Figure 3:
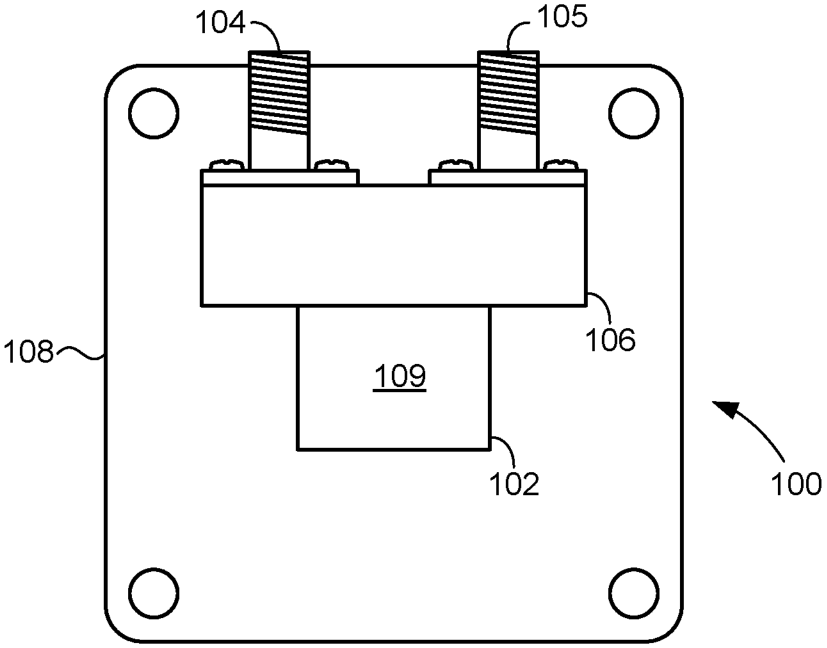
FIG. 3 is an end view of the active waveguide transition shown in FIGS. 1 and 2.
Figure 4:
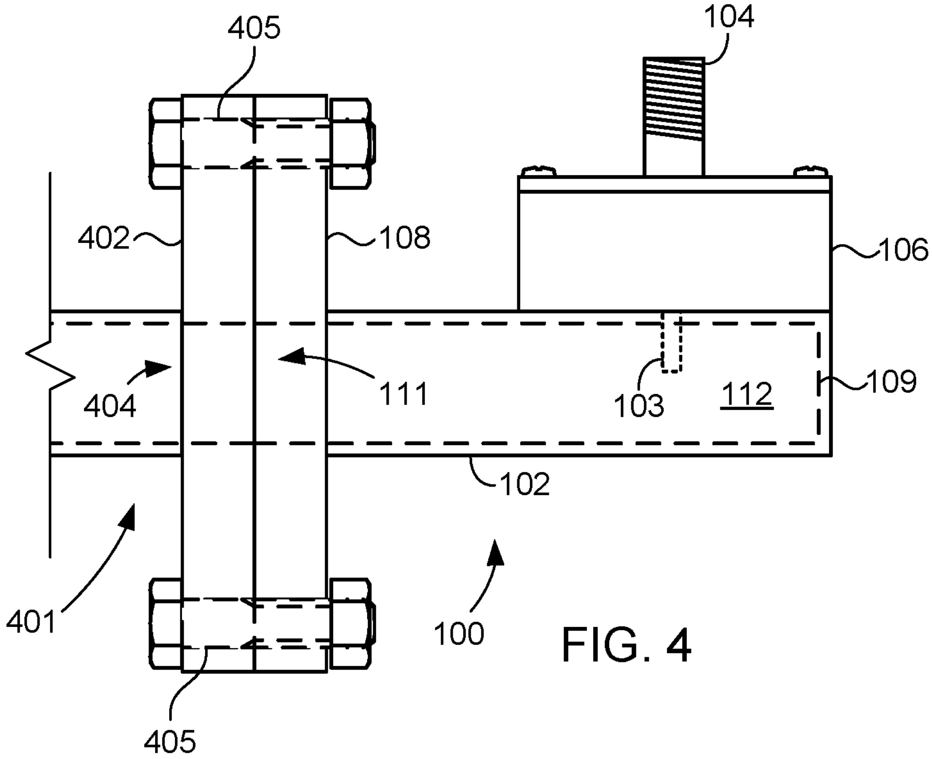
FIG. 4 is a side view similar to FIG. 2 but showing the active waveguide transition connected to an antenna feedhorn.

FIGS. 1 through 3 illustrate an embodiment of an active waveguide transition 100 according to one aspect of the invention, while FIG. 4 shows the active waveguide transition 100 operably connected to a feedhorn shown generally at 401 in FIG. 4. Active waveguide transition 100 includes a waveguide 102, a probe 103 (shown in FIGS. 2 and 4), two RF electrical signal connectors 104 and 105 (connector 105 shown only in FIGS. 1 and 3), and a first circuit assembly which is concealed within a housing 106 in the views of FIGS. 1-4. The various circuits and other components of the circuit assembly will be described below in connection with FIGS. 5 through 8.

Waveguide 102 comprises an enclosure extending along a wave propagation axis W1 between a connector 108 at one end of the waveguide along axis W1 (shown in FIG. 2) and a back short wall 109 (shown in FIGS. 2 through 4) at the opposite end of the waveguide. The back short wall 109 encloses that end of waveguide 102 while the waveguide defines an opening 111 (shown in FIGS. 1, 2, and 4) at the end including connector 108. As shown in FIG. 4, connector 108 is adapted to cooperate with a corresponding connector 402 at a proximal end of feedhorn 401 to connect active waveguide transition 100 to the feedhorn with waveguide transition opening 111 operably aligned with a corresponding opening 404 at the proximal end of the feedhorn. Although the complete feedhorn 401 in not shown in FIG. 4, those skilled in the art of RF communications systems will appreciate that feedhorn 401 extends to the left in the orientation of the figure to an enlarged distal end through which RF waves may be received into the feedhorn and through which RF waves may be radiated into free space either to a reflector or directly to a distant receiving antenna.

Waveguide 102 is made from a suitable conductive metal as is back short wall 109 (shown in FIGS. 2 through 4). Connector 108, which in this embodiment comprises a flange with through holes for receiving suitable fasteners (405 in FIG. 4), is also preferably but not necessarily formed from a conductive metal. Regardless of the particular form of the connector for connecting the active waveguide transition to the feedhorn, the connector may be attached to the respective waveguide in any particular fashion. In some forms of the invention, a flange comprising the waveguide transition connector may be welded on the waveguide portion of the device. It is also possible that the flange or other connector could be integrally formed with the waveguide portion (such as 102 in the figures) of the active waveguide transition.

As shown in FIGS. 2 and 4, probe 103 extends into the waveguide volume 112 at a suitable location spaced apart from back short wall 109. As is known in the field of waveguide transitions, probe 103 and connector 104 form an open circuit. As is also known in the field of waveguide transitions, probe 103 comprises a suitable electrically conductive material in a configuration that, when operating in a receiving mode, converts a portion of the incident RF wave propagating in direction R shown in FIG. 2 into a corresponding RF electrical signal that may be processed by receiving equipment. When operating in a transmission mode, probe 103 receives an RF electrical transmission signal and converts some of the energy of that signal into corresponding RF waves which radiate out both directly and after reflection off back short wall 109 in the direction T shown in FIG. 2.

According to the present invention, the circuit assembly mounted in housing 106 at active waveguide transition 100 includes active electronic circuit elements which will be described below in connection with FIGS. 5-8. By placing the active electronics at active waveguide transition 100, the active waveguide transition according to the invention may be connected directly to the distal end connector 402 of feedhorn 401 as shown in FIG. 4 without having any intermediate waveguide which extends from the distal end of the feedhorn to the active waveguide transition. Eliminating any such intermediate waveguide reduces costs, overall weight of the communication system, and simplifies design and construction since it is not necessary to route the rigid intermediate waveguide through a device with which the RF communication system is associated. This is particularly advantageous where the device with which the RF communication system is associated is a device such as a satellite which may be strictly limited in terms of overall weight and size.

Figure 5:
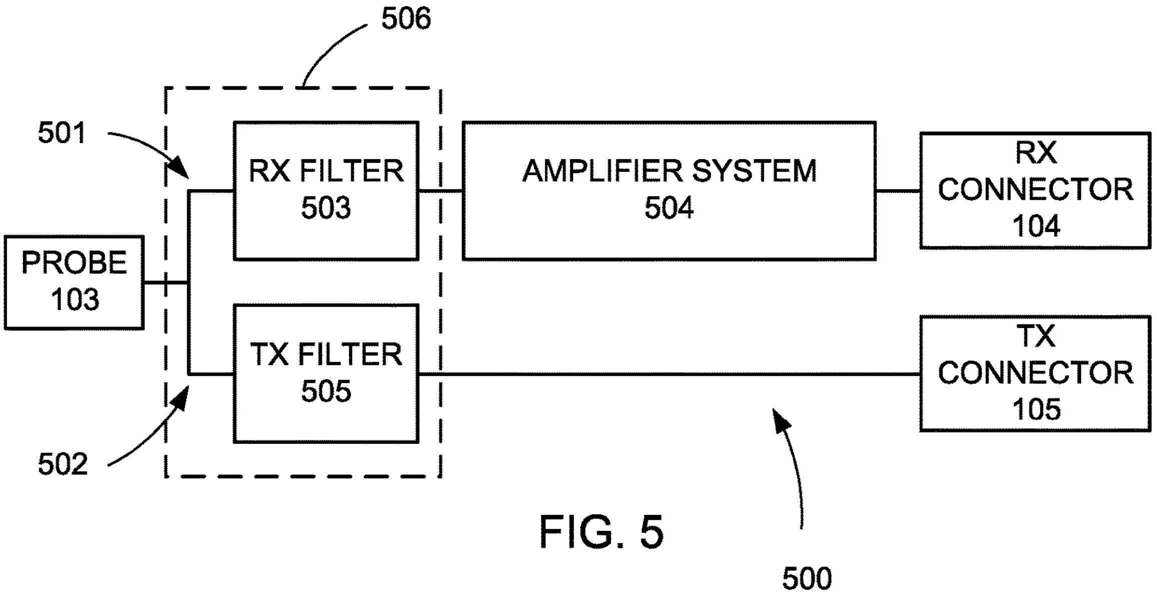
FIG. 5 is an electrical block diagram showing the circuit elements included in the active waveguide transition shown in FIGS. 1-4.

FIG. 5 shows a schematic block diagram 500 of the circuit components in the circuit assembly of active waveguide transition 100 shown in FIGS. 1 through 4. In particular, FIG. 5 shows probe 103 connected to two different signal paths indicated generally at 501 and 502. First signal path 501 includes a receive filter (Rx Filter) 503, an amplifier system 504, and RF electrical signal connector 104 also shown in FIGS. 1 and 3. Connector 104 here represents a receive port in circuit 500. Second signal path 502 extends from probe 103 through a transmit filter (Tx Filter) 505 to RF electrical signal connector 105 shown in FIGS. 1 and 3. Connector 105 here represents a transmit port in circuit 500. Thus the arrangement in FIG. 5 may comprise a diplexer 506 to facilitate receiving signals through active waveguide transition 100 on a first frequency band and transmitting signals through the active waveguide transition on a second frequency band which does not overlap with the first frequency band. Receive filter 503 functions to pass the desired receive signal frequencies to amplifier system 504 and ultimately to connector/receive port 104 while suppressing transmit signals applied to the probe along the transmit signal path 502. Similarly, transmit filter 505 passes the transmit signal frequencies applied through connector/transmit port 105 and suppresses the receive signal frequencies. Amplifier system 504 within the receive path 501 includes an amplifier together with associated circuitry such bias circuitry for providing the bias required by the amplifier, and functions to amplify the receive signal picked up by probe 103 and passed through receive filter 503 to a suitable signal level for output at the connector/receive port 104 and then transmission on through a suitable electrical cable such as coaxial cable (not shown) to further signal processing equipment which is not illustrated. It will be noted that a DC bias signal may be supplied to circuit 500 through the coaxial or other cable connected to connector/receive port 104 (or alternatively connector/transmit port 105).

Figure 6:
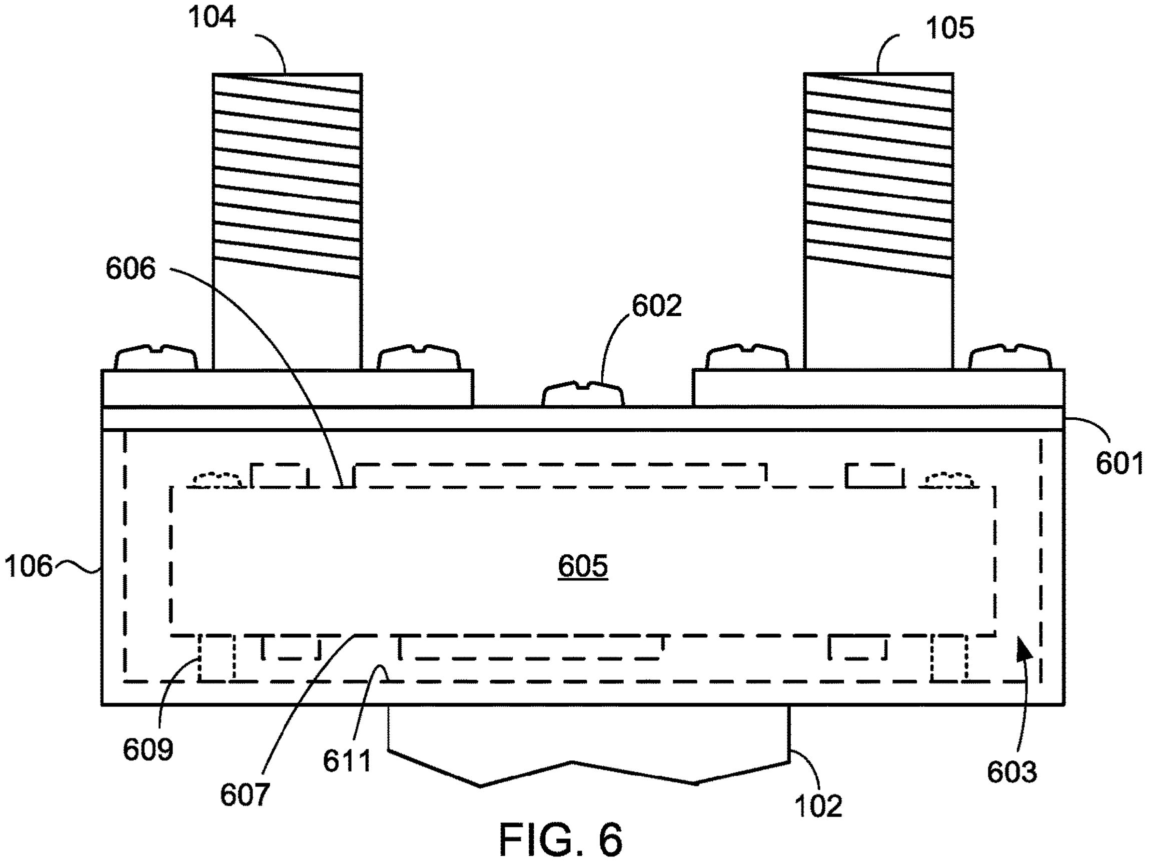
FIG. 6 is an enlarged end view of the circuit component housing for the active waveguide transition shown in FIGS. 1-4, showing a circuit board within the housing.

FIG. 6 shows further details of how the circuit assembly in the embodiment of FIGS. 1 through 4 may be mounted on waveguide 102 of active waveguide transition 100. FIG. 6 shows housing 106 which is mounted directly on an exterior surface of waveguide 102 and enclosed with a lid 601 with peripheral fasteners 602. The two RF electrical signal connectors 104 and 105 are shown mounted on the lid 601 in this embodiment. Housing 106 defines an interior area 603 for receiving various circuit elements which, in this embodiment, include elements mounted on or formed in a multi-layer ceramic substrate (MLCS) 605. MLCS 605 defines both an upper surface 606 and lower surface 607 on which various circuit components may be mounted in this embodiment. Because MLCS 605 includes components on lower surface 607, MLCS 605 is mounted in housing 106 on standoffs 609 so as to position the substrate properly and provide clearance between the various components mounted on lower surface 607 and the bottom inner surface 611 of the housing 106. It will be appreciated that a suitable conductor extends from MLCS 605 to probe 103, although this signal path is not shown in FIG. 6. Also a conductor extends from MLCS 605 to connector/receive port 104, and a separate conductor extends from MLCS 605 to connector/transmit port 105, although neither conductor is shown in FIG. 6.

Figure 8:
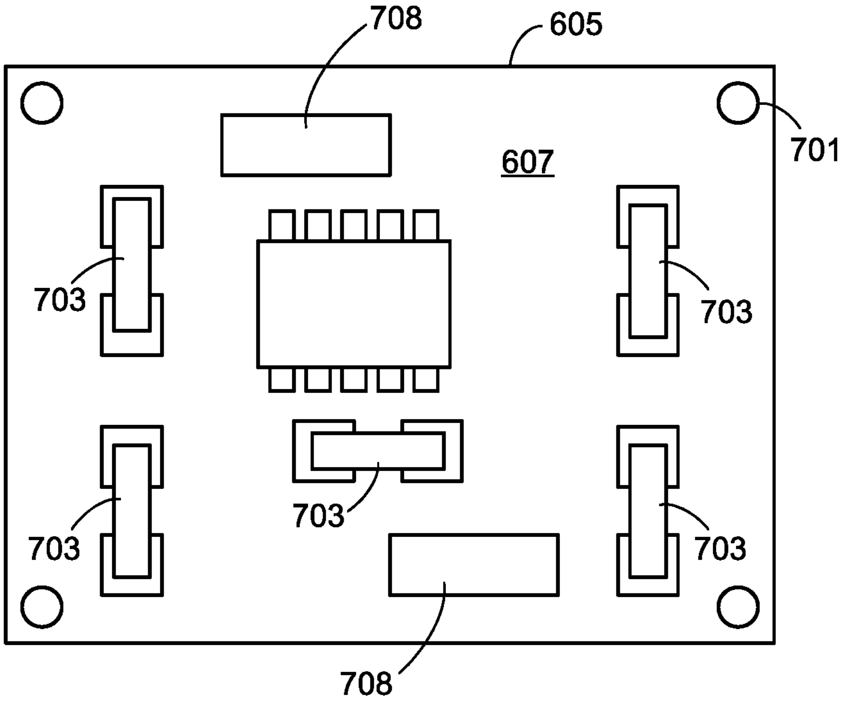
FIG. 8 is a bottom plan view of the circuit board shown in FIG. 7.
Figure 7:
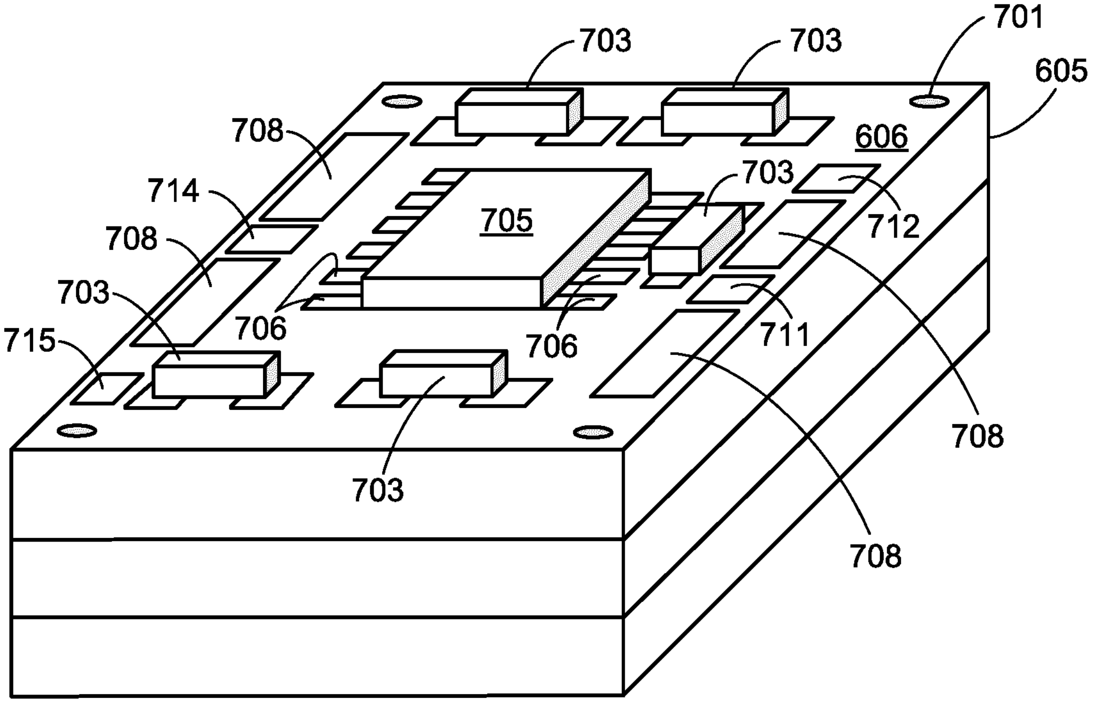
FIG. 7 is an isometric schematic representation of a multi-layer circuit board implementing circuitry for the active waveguide transition shown in FIGS. 1-5.

FIG. 7 shows the MLCS 605 of FIG. 6 removed from housing 106 (FIG. 6) and in a perspective showing the upper surface 606 of the substrate. FIG. 8 provides a plan view of the bottom surface 607 of the MLCS 605. Through holes 701 for receiving suitable fasteners and connecting to the standoffs 609 shown in FIG. 6 are provided at the corners of MLCS 605 in this particular embodiment, and these through holes are visible in both FIGS. 7 and 8. Other arrangements may use clips or other connecting arrangements or securing arrangements for securing the MLCS 605 in the desired position within housing 106 (FIG. 6). It is also possible that an MLCS such as MLCS 605 may include features on the bottom surface which register with corresponding features in the housing to support the substrate in the desired position. Additional features on the upper surface may register with corresponding features of the lid when the lid is connected to the housing and thereby retain the substrate in the desired position without clips and without through holes and associated fasteners.

FIGS. 7 and 8 also show numerous conductor pads formed on the upper and lower surfaces, 606 (FIG. 7) and 607 (FIG. 8), of MLCS 605. Some of these pads may provide connecting points for various circuit elements such as circuit elements 703 (which may in fact be different types of circuit elements although commonly labeled here to simplify the discussion). The circuit elements 703 may include, for example, elements associated with the biasing circuit for amplifier 705 shown in FIG. 7. Amplifier 705 may comprise a suitable integrated circuit chip mounted on and connected to the various conductor pads 706 as shown in FIG. 7.

Some of the conductor pads are open in FIGS. 7 and 8. These conductor pads may include ground pads 708 both on the upper and lower surfaces, 606 (FIG. 7) and 607 (FIG. 8). Conductor pad 711 shown in FIG. 7 may provide a connecting point for a suitable conductor extending to the receive connector/port 104 (in FIG. 1 for example), while pad 712 shown in FIG. 7 may comprise a connecting point for a suitable conductor extending to the transmit connector/port 105 (in FIG. 1 for example). Pad 714 shown in FIG. 7 may comprise a connecting point for a conductor extending to probe 103 shown in FIGS. 2 and 4. It will be noted that pads 711, 712, and 714 are formed on the upper surface of the MLCS 605 to facilitate manufacturing, although they could be located elsewhere on MLCS 605. One or more test conductor pads 715 (FIG. 7) may also be formed on the upper surface 606 of MLCS 605 and/or the lower surface 607 providing testing points for various circuit elements in the assembly.

Various additional circuit elements may be embedded within the layers of MLCS 605 as shown in FIG. 6 as is known in the art. In particular, the component or components making up each of receive (RX) filter 503 and transmit (TX) filter 505 shown FIG. 5 may be embedded in MLCS 605 (receive filter 503 thus representing a first embedded filter and transmit filter 505 representing a second embedded filter). For example, one or more of the filters may comprise a microstrip filter embedded in the layers of MLCS 605. Although not shown in the views of FIGS. 6, 7, and 8, it will be appreciated that various vias and conductor paths are also formed within MLCS 605 to connect the embedded components with externally mounted components (such as components 703 and 705) and conductor pads on the exterior surfaces of MLCS 605. Regardless of where the particular circuit elements of the circuit assembly are located in MLCS 605, the substrate may preferably comprise a low-temperature co-fired ceramic (LTCC) package. Various additional circuit elements may be embedded within the layers of MLCS 605 as is known in the art. In particular, the component or components making up each of receive filter 503 and transmit filter 505 shown FIG. 5 may be embedded in MLCS 605. For example, one or more of the filters may comprise a microstrip filter embedded in the layers of MLCS 605. Although not shown in the views of FIGS. 6, 7, and 8, it will be appreciated that various vias and conductor paths are also formed within MLCS 605 to connect the embedded components with externally mounted components (such as components 703 and 705) and conductor pads on the exterior surfaces of MLCS 605. Regardless of where the particular circuit elements of the circuit assembly are located in MLCS 605, the substrate may preferably comprise a low-temperature co-fired ceramic (LTCC) package.

There are numerous variations on the particular embodiment shown in FIGS. 1 through 8 within the scope of the present invention. For example, although active waveguide transition 100 shown in FIGS. 1 through 8 is adapted for both receiving RF communications and transmitting RF communications, an active waveguide transition embodying the principles of the invention may include only receiving capability or only transmitting ability. Of course, in the situation where the active waveguide transition facilitates either receiving or transmitting but not both, the device will include only a single RF electrical signal connector. Embodiments of the invention are also not limited to any particular type of RF electrical signal connector. However, those familiar with RF communications will appreciate that coaxial cable is well-suited for carrying RF communication signals and thus the RF electrical signal connectors preferably comprise connectors for coaxial cable (such as SMA and SMK connectors, for example).

Embodiments of the invention are also not limited to any particular cross-sectional shape for the waveguide of the active waveguide transition. Although a rectangular cross-section waveguide 102 is shown for the example of FIG. 1 through 4, circular or other cross-sectional shapes may be used within the scope of the invention. It is noted however that the rectangular waveguide 102 shown in FIGS. 1 through 4 has the advantage of providing planar surfaces to which the housing 106 for the circuit assembly may be mounted.

The invention is not limited to a particular type of connector for the active waveguide transition. Although the flange-type connector 108 is shown in FIGS. 1 through 4 is well-suited for forming the desired operable connection between the active waveguide transition and the feedhorn, any other type of connecting arrangement capable of providing the desired operable connection may be employed. An operable connection between the feedhorn and active waveguide transition in this sense means that the connector aligns the waveguides of the two components sufficiently to prevent undue reflections or otherwise interfere with RF waves propagating through the feedhorn and active waveguide transition. In some cases the waveguide portion of the active waveguide transition (the portion labeled 102 in FIGS. 1 through 4) may be integrally formed with the proximal end of a feedhorn, thus dispensing with the need for connectors such as connectors 108 and 402 in FIG. 4. Further variations will be apparent from the alternative embodiments described below in connection with FIGS. 9 through 17.

Figure 9:
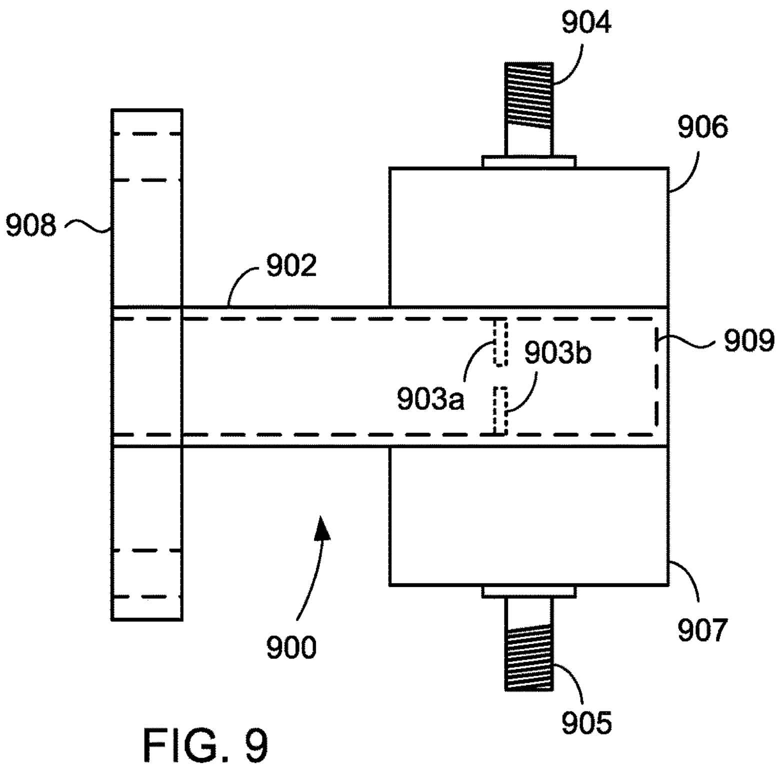
FIG. 9 is a side view of an additional embodiment of an active waveguide transition according to the present invention.
Figure 10:
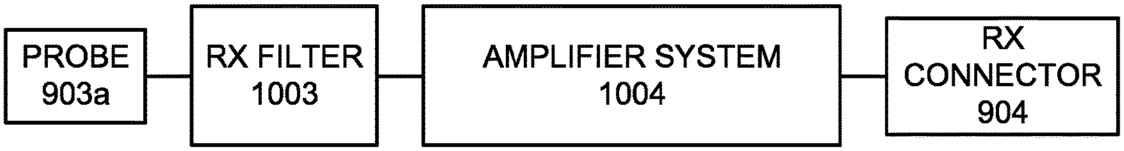
FIG. 10 is an electrical block diagram of a receiving circuit for the active waveguide transition shown in FIG. 9.
Figure 11:
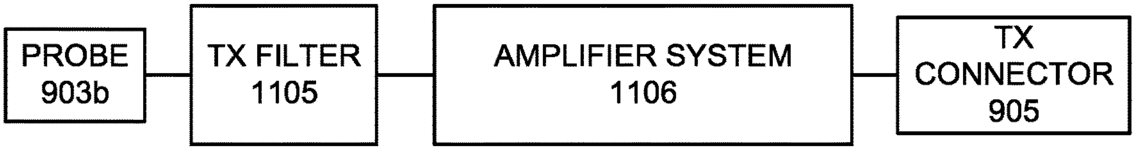
FIG. 11 is an electrical block diagram of a transmitting circuit for the active waveguide transition shown in FIG. 9.

FIGS. 9 through 11 may be used to describe an alternative embodiment of an active waveguide transition that facilitates both reception and transmission of RF communication signals. Referring to FIG. 9, this alternative active waveguide transition 900 includes a waveguide 902 portion similar to that shown in the previous embodiment together with a connector 908 and a back short wall 909. However, active waveguide transition 900 includes two separate circuit assemblies, each shown in FIG. 9 in a respective housing 906, 907 mounted on different external surfaces of the waveguide 902. Each of the two circuit assemblies is operatively connected to a respective probe 903*a* and 903*b* extending into the volume defined by the waveguide 902. In this embodiment, one circuit assembly and its associated probe 903*a*, 903*b* may be configured for receiving RF communication signals whereas the other circuit assembly and its associated probe may be configured to transmit RF communication signals. Active waveguide transition 900 includes a suitable RF electrical signal connector 904 and 905 which correspond to the connectors 104 and 105 described above in connection with the embodiment of FIGS. 1-8.

FIG. 10 shows a circuit block diagram for the circuit assembly for receiving RF communication signals in the embodiment of FIG. 9. The circuit diagram shows a signal path from the probe 903*a* through a receive filter (RX FILTER) 1003 and amplifier system 1004 to RF electrical signal receive port/connector (RX CONNECTOR) 904. Receive filter 1003 and amplifier system 1004 are included in the circuit assembly in housing 906 in FIG. 9 and are mounted on or formed in an MLCS similarly to the above-described MLCS 605. FIG. 11 provides a circuit block diagram for the circuit assembly for transmitting RF communication signals through the active waveguide transition 900 shown in FIG. 9 and feedhorn (not shown) which may be connected to the active waveguide transition. In particular FIG. 11 shows a signal path from probe 903*b* through a transmit filter (TX FILTER) 1105 and amplifier system 1106 to an RF electrical signal port/connector (TX CONNECTOR) 905 in FIG. 11. Transmit filter 1105 and amplifier system 1106 are included in the circuit assembly in housing 907 in FIG. 9 and are mounted on or formed in an MLCS similar to the above-described MLCS 605. Comparing the diagram of FIG. 11 with the diplexer arrangement shown in FIG. 5, it will be appreciated that FIG. 11 includes amplifier system 1106 in the transmit signal path whereas no such amplifier system is included in the transmit signal path in FIG. 5. Alternative arrangements to that shown in FIG. 11 may include no amplifier system for amplifying the signal at the active waveguide transition similar to the arrangement shown in FIG. 5. Similarly, the diplexer arrangement in FIG. 5 may alternatively include an amplifier system such as that shown in FIG. 11 in the transmit signal path. Depending upon the application and the particular needs for the transmission signal, it may be desirable to provide some amplification of the transmit signal at the active waveguide transition as indicated in FIG. 11. Otherwise, all amplification of the transmit signal may be performed upstream of the active waveguide transition and thus the transmit port for the active waveguide transition may receive an already suitably amplified signal for transmission through the active waveguide transition. It should also be appreciated that an amplifier system such as any of the systems shown in FIGS. 5, 10, and 11 may include one or more amplifier stages each with respective biasing circuitry. Multiple stage amplifiers may be required in the receive signal path particularly in the higher frequency ranges of RF communications due to losses that may occur in cable carrying signals from the active waveguide transition to signal processing circuitry for extracting information from the signals.

The embodiments illustrated thus far both comprise right angle transitions (also known as, E-plane transitions or orthogonal transitions) in which the probe (103 in FIGS. 2, 4, and 5, 903*a* in FIGS. 9 and 10, and 903*b* in FIGS. 9 and 11) extends at a right angle to the axis of the RF wave path along the waveguide portion of the active waveguide transition. Active waveguide transitions according to the invention are not limited to this right angle transition arrangement. The active waveguide transition 1200 shown in FIGS. 12 and 13 includes an in-line transition in which the probe 1203 extends into the waveguide 1202 along the waveguide axis W1 as shown in FIG. 12.

Figure 12:
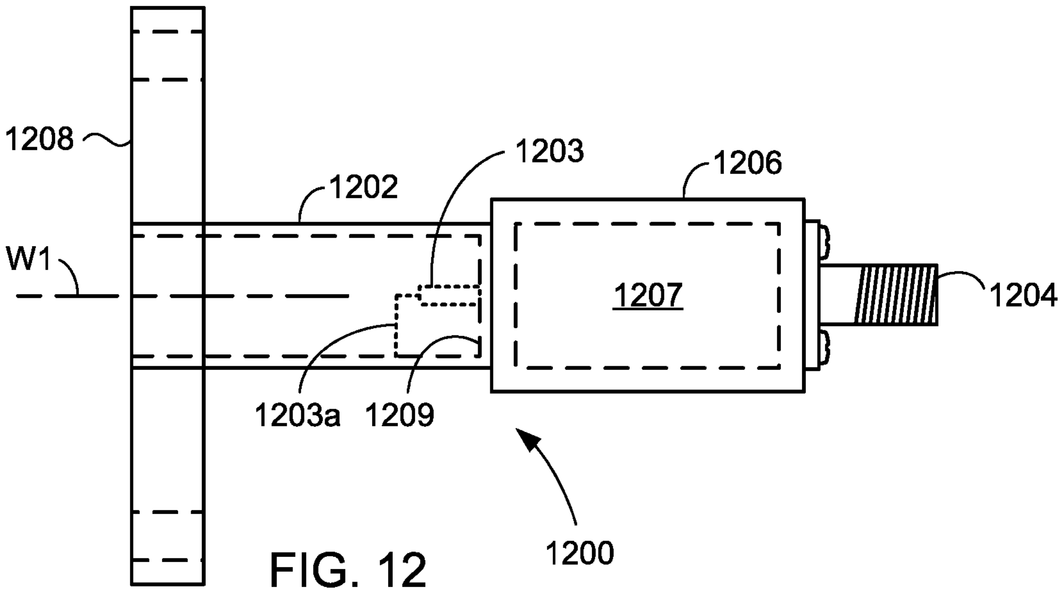
FIG. 12 is a side view of another embodiment of an active waveguide transition according to the present invention.

Those skilled in the art of waveguide transitions will appreciate that this in-line arrangement (also known as an end-launched coaxial transition) requires a shorting elbow that extends from the probe 1203 shown only in FIG. 12 to the upper or lower side defining the waveguide interior volume. For in-line transitions, shorting elbow 1203*a* shown only in FIG. 12 establishes a (DC) short circuit, which sets up a time-varying magnetic wave. Shorting elbow 1203*a* can have a 90-degree, rectangular cross-section, among other possible configurations (e.g., a stepped-shaped probe).

Figure 13:
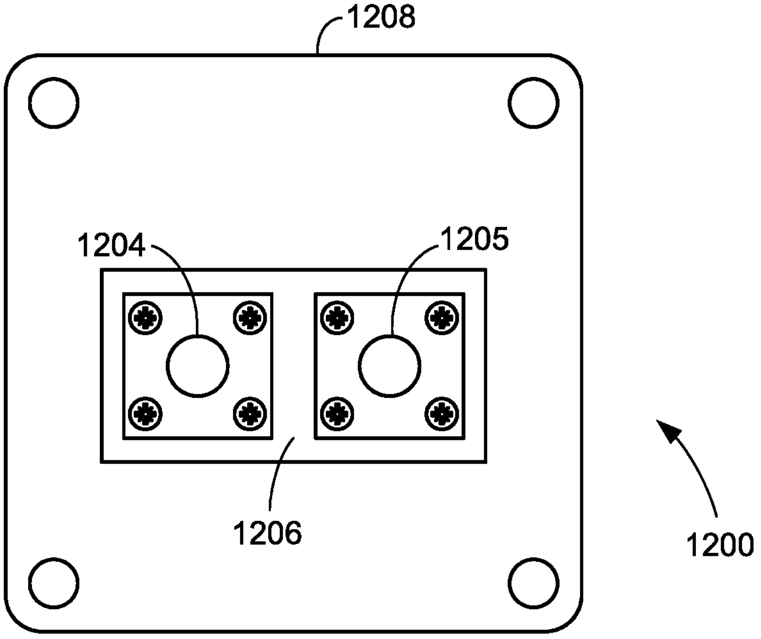
FIG. 13 is an end view of the active waveguide transition shown in FIG. 12.

With the in-line arrangement shown in FIGS. 12 and 13, the housing 1206 for the circuit assembly may be conveniently mounted at the back short wall 1209 (FIG. 12) of the active waveguide transition 1200. The RF electrical signal connectors 1204 and 1205 (1205 shown only in FIG. 13) may be mounted on housing 1206 on the side opposite to the side connected to back short wall 1209 as shown in FIG. 12. FIG. 12 shows a cavity 1207 within housing 1206 in which the circuit assembly may be housed in this third illustrated embodiment. As with the other embodiments, the circuit assembly includes an MLCS (such as the above-described MLCS 605 shown in FIG. 6) which may be mounted in any suitable orientation in housing 1206. In particular, the planes of the MLCS in this embodiment may be mounted in the housing parallel to the waveguide axis W1 (that is, the planes of the MLCS layers may extend horizontally in the orientation of FIG. 12).

Aside from the orientation of probe 1203 and the position of the circuit assembly in the embodiment shown in FIGS. 12 and 13, the apparatus is similar to that shown in the previous two embodiments including a suitable connector 1208, in this case a flange at the end of the waveguide 1202 opposite back short wall 1209 (as shown in FIG. 12). The circuit arrangement for the embodiment in FIGS. 12 and 13 may be similar to that shown in FIG. 5 together with the above described variations on that circuit arrangement.

Figure 14:
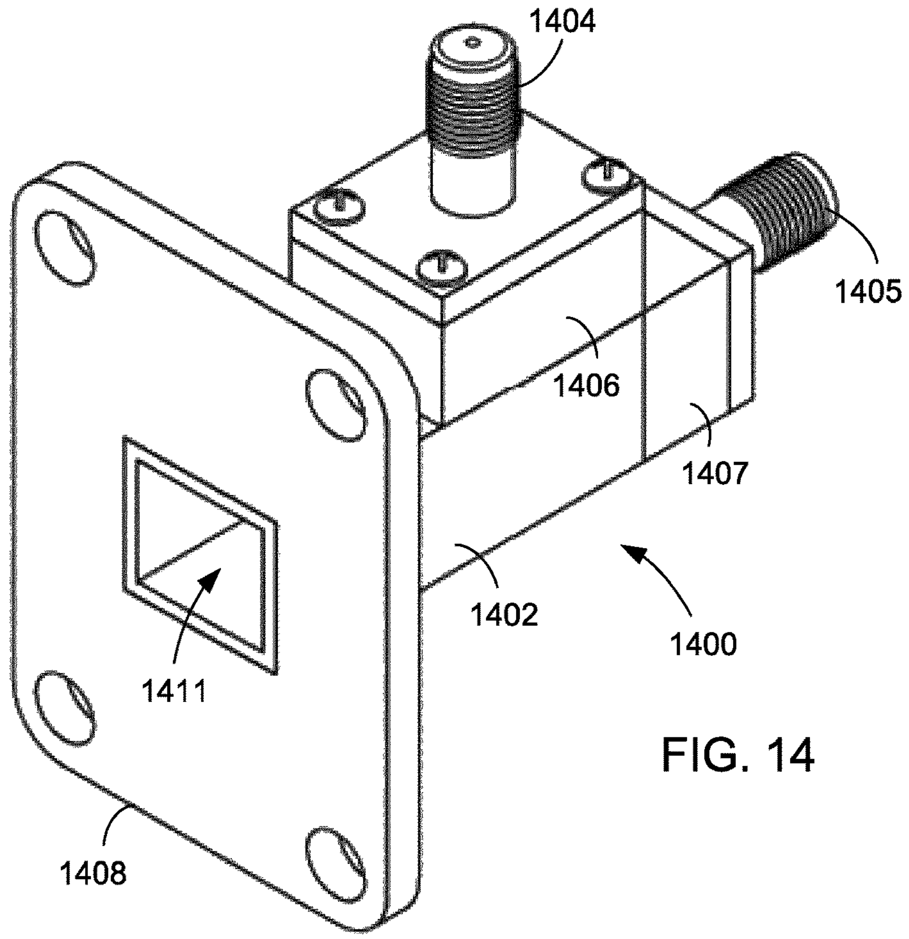
FIG. 14 is a view in perspective of an embodiment of an active waveguide transition according to the present invention in which both right-angle and in-line probe configurations are used.
Figure 15:
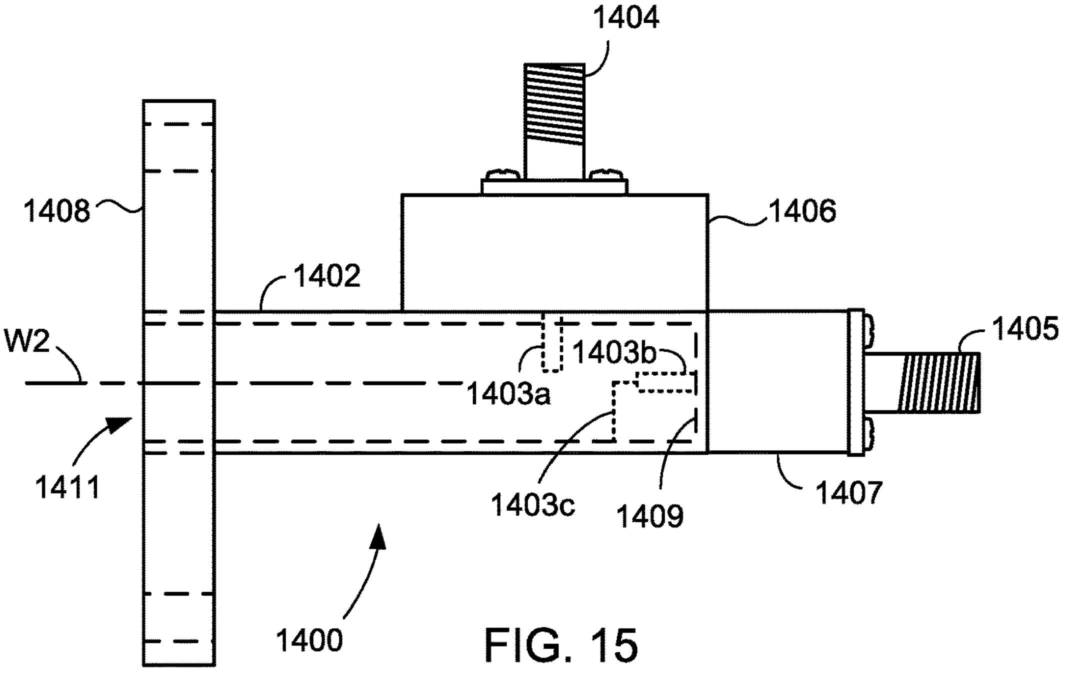
FIG. 15 is a side view of the active waveguide transition shown in FIG. 14.

FIGS. 14 and 15 show another embodiment of an active waveguide transition according to the present invention. The active waveguide transition 1400 of this embodiment is similar to the embodiment shown in FIGS. 1 through 3, and includes a waveguide 1402, a first probe 1403*a* (shown only in FIG. 15), and two RF electrical signal connectors 1404 and 1405. Active waveguide transition 1400 further includes a first circuit assembly which is concealed within a housing 1406 in the views of FIGS. 14 and 15. Waveguide 1402 comprises an enclosure extending along a wave propagation axis W2 between a connector 1408 at one end of the waveguide along axis W2 and a back short wall 1409 (shown only in FIG. 15) at the opposite end of the waveguide. The back short wall 1409 encloses that end of waveguide 1402 while the waveguide defines an opening 1411 at the end including connector 1408. However, rather than employing a single probe in the right-angle orientation as in the embodiment of FIGS. 1-3, active waveguide transition 1400 includes a second probe 1403*b* (shown only in FIG. 15) oriented in the in-line position as described above in connection with FIG. 12. Second probe 1403*b* in FIG. 15 includes shorting elbow 1403*c*. Active waveguide transition 1400 also includes a second circuit assembly concealed within a second housing 1407 mounted at back short wall 1409. The second RF connector 1405 is mounted on second housing 1407.

The first circuit contained in first housing 1406 in FIGS. 14 and 15 may comprise one of a transmitting or receiving circuit, such as those shown in FIGS. 10 and 11, respectively. The second circuit contained in second housing 1407 may comprise the other one of the transmitting or receiving circuit. A particularly advantageous arrangement for the embodiment of FIGS. 14 and 15 includes a receiving circuit such as that shown in FIG. 10 located in housing 1406 and operatively connected to the right-angle probe 1403*a*, and includes a transmitting circuit such as that shown in FIG. 11 (with or without the amplifier system) connected to in-line probe 1403*b*. This arrangement is advantageous because in-line transition designs commonly handle higher powers compared to right-angle designs, and signals will typically be transmitted at power levels higher than the power level of a received signal. In contrast, right-angle transitions, vis-à-vis in-line transitions, generally have lower Voltage Standing Wave Ratios and less loss across a given frequency band, and thus particularly adapted for receiving circuits.

Figure 16:
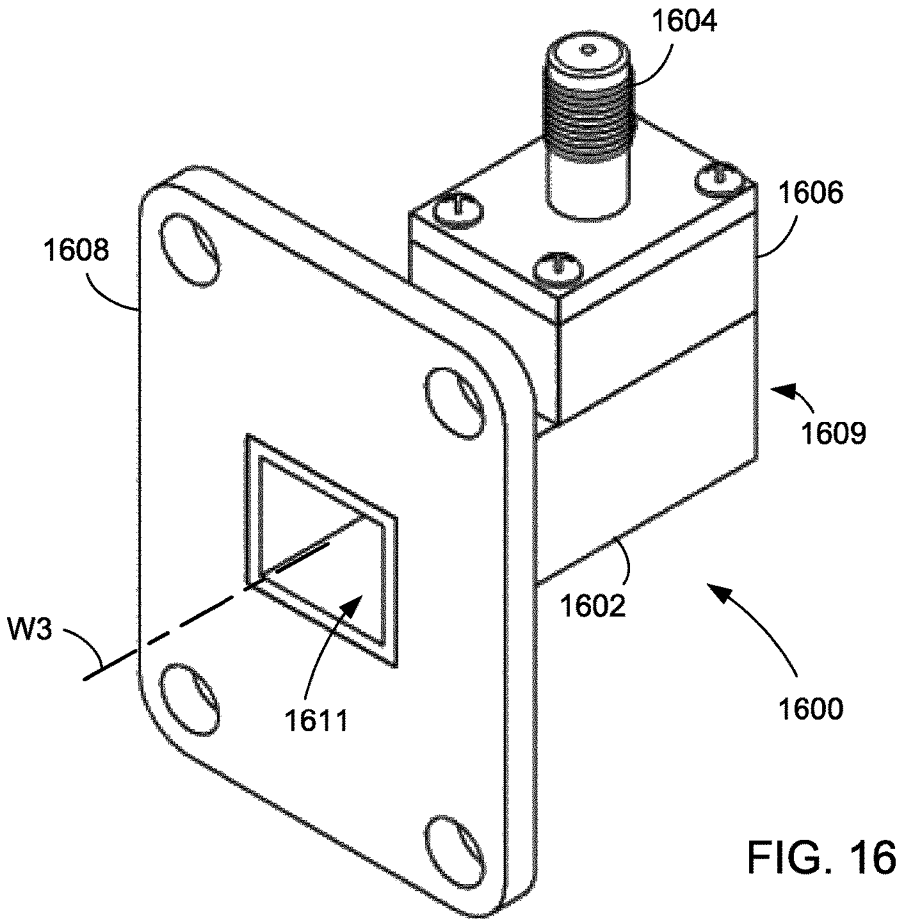
FIG. 16 is a view in perspective of an embodiment of an active waveguide transition according to the present invention in which a single RF connector is used for receiving and/or transmitting signals.

FIG. 16 shows an alternative embodiment of an active waveguide transition 1600 employing a single probe (not shown in this view) preferably in the right-angle orientation similar to probe 103 shown in FIG. 2. Active waveguide transition 1600 of this embodiment is similar to the embodiment shown in FIGS. 1 through 3 in that it includes a waveguide 1602 comprising an enclosure extending along a wave propagation axis W3 between a connector 1608 at one end of the waveguide along axis W3 and a back short wall 1609 at the opposite end of the waveguide. The back short wall 1609 encloses that end of waveguide 1602 while the waveguide defines an opening 1611 at the end including connector 1608. Unlike the embodiment shown in FIGS. 1 through 3, active waveguide transition 1600 includes only a single RF electrical signal connector 1604. In the embodiment of FIG. 16, the circuit concealed in housing 1606 may be a receiving circuit such as that shown in FIG. 10 for example, a transmitting circuit such as that shown in FIG. 11 for example, or a receiving and transmitting circuit such as circuit 1700 shown in FIG. 17. In any case, the arrangement of FIG. 16 requires only a single RF cable to connect to RF electrical signal connector 1604, to facilitate RF reception and/or transmission.

Figure 17:
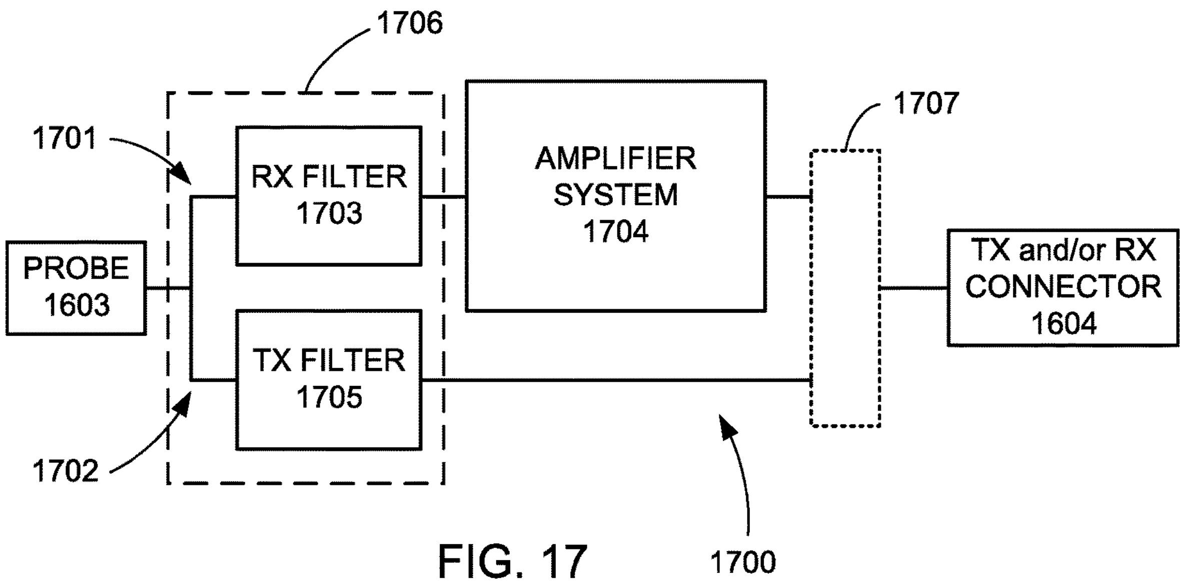
FIG. 17 is an electrical block diagram of a circuit for the active waveguide transition shown in FIG. 16.

The example circuit shown in FIG. 17 for facilitating both reception and transmission in the embodiment shown in FIG. 16 shows probe 1603 connected to RF signal connector 1604 (labeled TX and/or RX CONNECTOR in FIG. 17) through two different signal paths indicated generally at 1701 and 1702. First signal path 1701 includes a receive filter (Rx Filter) 1703 (part of diplexer 1706), an amplifier system 1704 (which functions similarly to amplifying system 504 described above in connection with FIG. 5), and diplexer 1707. Second signal path 1702 extends from probe 1603 through a transmit filter (Tx Filter) 1705 (of diplexer 1706) and through diplexer 1707 to RF electrical signal connector 1604. The arrangement of diplexers 1706 and 1707 in FIG. 17 facilitate receiving signals through active waveguide transition 1600 on a first frequency band and transmitting signals through the active waveguide transition on a second frequency band which does not overlap with the first frequency band.

Figure 18:
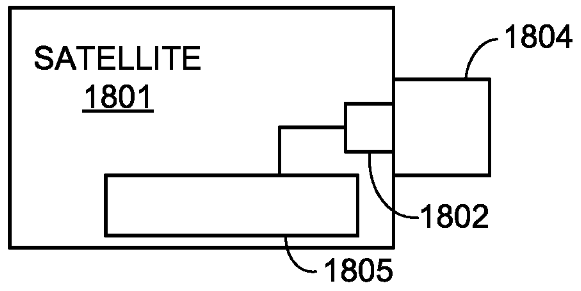
FIG. 18 is a block diagram representing a satellite employing an active waveguide transition according to the present invention.

FIG. 18 shows a block diagram of a satellite 1801 incorporating an active waveguide transition 1802 according to the present invention. Active waveguide transition 1802 is operatively connected between an antenna 1804 mounted on satellite 1801 and a signal processing device 1805 mounted within an enclosure of the satellite. Although not shown in FIG. 18 due to the scale of the figure, it will be appreciated that antenna 1804 will include a feedhorn which terminates in an end having a connector which may be similar to that shown at 402 in FIG. 4. Regardless of the form of the feedhorn connector, the feedhorn connectors is adapted to cooperate with a corresponding connector of the active waveguide transition 1802 to produce an alignment of the feedhorn and waveguide transition such as that shown in FIG. 4. Alternatively to a connector arrangement between the feedhorn and active waveguide transition 1802, the feedhorn and active waveguide transition may be integrally formed as discussed above. The connection between active waveguide transition 1802 and signal processing device 1805 may be in the form of one or more cables, each connected at one end to an RF electrical signal connector associated with active waveguide transition 1805 (such as connector 104 in FIGS. 1-3) and connected at the opposite end to a suitable connector (not shown) associated with the signal processing device 1805. The signal processing device 1805 may be responsible for processing received RF electrical signals to extract the intended information and/or generating RF electrical signals to be directed to active waveguide transition 1802 for conversion to RF waves transmitted into free space via antenna 1804. Both the signal processing for receiving RF electrical signals and generating RF electrical signals are well known in the art and will thus not be discussed further herein.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as "top," "bottom," "upper," "lower," and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

As another example, diplexers 506 (FIG. 5), 1706, and 1707 (FIG. 17) are schematically shown as dashed boxes to show one possible circuit arrangement. Rx and Tx signal filtering may be implemented via alternative configurations (e.g., non-diplex) and arrangements.

The invention claimed is:

1. An active waveguide transition comprising:

(a) a waveguide defining a waveguide volume, the waveguide including a back short wall at a first end;

(b) a first probe mounted on the waveguide in an operable position extending into the waveguide volume;

(c) a first RF electrical signal connector; and (d) a first circuit assembly mechanically coupled to an exterior surface of the waveguide, the first circuit assembly including a first multi-layer ceramic substrate, an RF amplifier system mounted on a layer of the first multi-layer ceramic substrate, and a first embedded RF filter that is arranged in the first multi-layer ceramic substrate, the RF amplifier system electrically coupled to the first embedded RF filter, the first probe, and the first RF electrical signal connector to define an active first signal path for RF communication signals between the first probe and first RF signal connector.

2. The active waveguide transition of claim 1 wherein the exterior surface is planar and the first circuit assembly includes a circuit attachment surface that abuts the waveguide exterior surface.

3. The active waveguide transition of claim 2 wherein the first multi-layer ceramic substrate is mounted within a housing of the first circuit assembly and the circuit attachment surface comprises a surface of the housing.

4. The active waveguide transition of claim 1 wherein the RF amplifier system includes one or more RF amplifiers mechanically coupled to a peripheral layer of the first multi-layer ceramic substrate.

5. The active waveguide transition of claim 1 further including a waveguide connector at an end of the waveguide opposite to the back short wall, the waveguide connector being adapted to operably connect the waveguide to an RF communication feedhorn.

6. The active waveguide transition of claim 1 where the first multi-layer ceramic substrate is a low-temperature co-fired ceramic package.

7. The active waveguide transition of claim 1 further including a second probe mounted on the waveguide in an operable position extending into the waveguide volume and a second RF electrical signal connector electrically coupled to the second probe to define a second signal path therebetween.

8. The active waveguide transition of claim 7 further including a second multi-layer ceramic substrate electrically coupled to and arranged between the second RF electrical signal connector and the second probe.

9. The active waveguide transition of claim 8 wherein the second multi-layer ceramic substrate is included in a second circuit assembly mechanically coupled to the exterior surface of the waveguide.

10. The active waveguide transition of claim 9 wherein the first circuit assembly is mechanically coupled to a first portion of the waveguide exterior surface and the second circuit assembly is mechanically coupled to a second portion of the waveguide exterior surface, the first and second portions defining parallel or orthogonal planes.

11. The active waveguide transition of claim 7 wherein the first probe is arranged as an open-circuit probe of a right-angle transition, and the second probe is arranged as a short-circuited probe of an in-line transition.

12. An active waveguide transition comprising:

(a) a waveguide defining a waveguide volume, the waveguide including a back short wall at a first end;

(b) a first probe mounted on the waveguide in an operable position extending into the waveguide volume;

(c) a first RF electrical signal connector;

(d) a first circuit assembly mechanically coupled to an exterior surface of the waveguide, the first circuit assembly including a first multi-layer ceramic substrate with an RF amplifier system mounted thereon, the RF amplifier system being electrically coupled to the first multi-layer ceramic substrate, the first probe, and the first RF electrical signal connector to define an active first signal path for RF communication signals between the first probe and first RF signal connector; and (e) a second RF electrical signal connector, the second RF electrical signal connector being electrically coupled to the first probe to define a second signal path between the first probe and the second RF electrical signal connector.

13. The active waveguide transition of claim 12 wherein the active first signal path between the first probe and the first RF electrical signal connector is for a receive RF communication signal and the second signal path between the first probe and the second RF electrical signal connector is a passive signal path for a transmit RF communication signal.

14. The active waveguide transition of claim 13 wherein the receive RF communication signal is within a first frequency range and the transmit RF communication signal is within a second frequency range which does not overlap with the first frequency range, and further including:

a first embedded RF filter electrically coupled to the first probe and the RF amplifier system within the active first signal path between the first probe and the first RF electrical signal connector, the first embedded RF filter adapted to pass the receive RF communication signal within the first frequency range and suppress signals within the second frequency range; and a second embedded RF filter electrically coupled in the second signal path between the second RF electrical signal connector and the first probe, the second embedded RF filter adapted to pass the transmit RF communication signal within the second frequency range and suppress signals within the first frequency range.

15. The active waveguide transition of claim 14 further comprising a diplexer that includes the first and second embedded RF filters.

16. The active waveguide transition of claim 14 further including a transmission RF amplifier electrically coupled to the first probe and the second RF electrical signal connector, the transmission RF amplifier arranged in the second signal path.

* * * * *